(12) United States Patent
Simpson

(10) Patent No.: US 9,828,284 B2
(45) Date of Patent: Nov. 28, 2017

(54) THERMAL HISTORY-BASED ETCHING

(71) Applicant: UT-BATTELLE, LLC, Oak Ridge, TN (US)

(72) Inventor: John T. Simpson, Clinton, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 62 days.

(21) Appl. No.: 14/229,385

(22) Filed: Mar. 28, 2014

(65) Prior Publication Data
US 2015/0274582 A1  Oct. 1, 2015

(51) Int. Cl.
| | |
|---|---|
| *B44C 1/22* | (2006.01) |
| *C03C 15/00* | (2006.01) |
| *C03C 25/68* | (2006.01) |
| *C03B 37/012* | (2006.01) |
| *C03B 37/025* | (2006.01) |
| *C03B 37/028* | (2006.01) |
| *C03B 37/075* | (2006.01) |
| *C03B 37/16* | (2006.01) |
| *G02B 1/18* | (2015.01) |

(Continued)

(52) U.S. Cl.
CPC ........ *C03C 15/00* (2013.01); *C03B 37/01205* (2013.01); *C03B 37/01211* (2013.01); *C03B 37/01214* (2013.01); *C03B 37/01242* (2013.01); *C03B 37/028* (2013.01); *C03B 37/0253* (2013.01); *C03B 37/075* (2013.01); *C03B 37/16* (2013.01); *C03C 3/089* (2013.01); *C03C 13/046* (2013.01); *C03C 25/68* (2013.01); *G02B 1/18* (2015.01); *C03B 2201/10* (2013.01); *C03B 2201/32* (2013.01); *C03B 2201/50* (2013.01); *Y10T 428/24355* (2015.01)

(58) Field of Classification Search
CPC . C03C 15/00; C03C 25/002; C03B 37/01205; C03B 37/01214
USPC .......................................... 216/9, 96, 97, 98
See application file for complete search history.

(56) References Cited

U.S. PATENT DOCUMENTS

| | | |
|---|---|---|
| 3,265,480 A | 8/1966 | Hicks |
| 3,275,428 A | 9/1966 | Siegmund |
| 3,284,332 A | 11/1966 | Gladrow et al. |

(Continued)

FOREIGN PATENT DOCUMENTS

| | | |
|---|---|---|
| DE | 10138036 | 2/2003 |
| JP | 2000311336 | 11/2000 |

(Continued)

OTHER PUBLICATIONS

Wikipedia, The Free Encyclopedia, "Softening Point" via https://en.wikipedia.org/wiki/Softening_point ; p. 1; 2015.*

(Continued)

*Primary Examiner* — Binh X Tran
(74) *Attorney, Agent, or Firm* — Fox Rothschild LLP

(57) ABSTRACT

A method for adjusting an etchability of a first borosilicate glass by heating the first borosilicate glass; combining the first borosilicate glass with a second borosilicate glass to form a composite; and etching the composite with an etchant. A material having a protrusive phase and a recessive phase, where the protrusive phase protrudes from the recessive phase to form a plurality of nanoscale surface features, and where the protrusive phase and the recessive phase have the same composition.

7 Claims, 12 Drawing Sheets

(51) Int. Cl.
*C03C 3/089* (2006.01)
*C03C 13/04* (2006.01)

(56) References Cited

U.S. PATENT DOCUMENTS

| | | |
|---|---|---|
| 3,586,895 A | 6/1971 | Sowers et al. |
| 5,141,312 A | 8/1992 | Thompson et al. |
| 5,192,278 A | 3/1993 | Hayes et al. |
| 5,225,933 A | 7/1993 | Myers et al. |
| 5,234,594 A | 8/1993 | Tonucci |
| 5,244,636 A | 9/1993 | Walt et al. |
| 5,332,681 A | 7/1994 | Tonucci et al. |
| 5,493,169 A | 2/1996 | Pierle |
| 5,498,258 A | 3/1996 | Hakky et al. |
| 5,536,193 A | 7/1996 | Kumar |
| 5,633,972 A | 5/1997 | Walt |
| 5,664,036 A | 9/1997 | Islam |
| 5,690,894 A | 11/1997 | Pinkel et al. |
| 5,814,524 A | 9/1998 | Walt et al. |
| 5,837,196 A | 11/1998 | Pinkel et al. |
| 5,859,937 A | 1/1999 | Nomura |
| 5,863,449 A | 1/1999 | Grabbe |
| 5,928,525 A | 7/1999 | Ohtsu et al. |
| 5,952,665 A | 9/1999 | Bhargava |
| 6,014,251 A | 1/2000 | Rosenberg et al. |
| 6,016,376 A | 1/2000 | Ghaemi et al. |
| 6,023,540 A | 2/2000 | Walt |
| 6,052,238 A | 4/2000 | Ebbesen et al. |
| 6,104,945 A | 8/2000 | Modell et al. |
| 6,146,593 A | 11/2000 | Pinkel et al. |
| 6,200,737 B1 | 3/2001 | Walt et al. |
| 6,231,744 B1 | 5/2001 | Ying et al. |
| 6,256,533 B1 | 7/2001 | Yuzhakov et al. |
| 6,266,459 B1 | 7/2001 | Walt et al. |
| 6,327,410 B1 | 12/2001 | Walt et al. |
| 6,406,845 B1 | 6/2002 | Walt et al. |
| 6,417,506 B1 | 7/2002 | Pinkel et al. |
| 6,482,593 B2 | 11/2002 | Walt et al. |
| 6,483,640 B1 | 11/2002 | Tonucci et al. |
| 6,503,231 B1 | 1/2003 | Prausnitz et al. |
| 6,511,463 B1 | 1/2003 | Wood et al. |
| 6,551,849 B1 | 4/2003 | Kenney |
| 6,660,363 B1 | 12/2003 | Barthlott |
| 6,795,617 B2 | 9/2004 | Dinu et al. |
| 6,800,860 B2 | 10/2004 | Dietz et al. |
| 6,813,402 B2 | 11/2004 | Narita et al. |
| 6,846,635 B1 | 1/2005 | Anderson et al. |
| 6,853,786 B2 | 2/2005 | Russell et al. |
| 6,859,570 B2 | 2/2005 | Walt |
| 6,890,764 B2 | 5/2005 | Chee et al. |
| 6,893,816 B1 | 5/2005 | Beattie |
| 6,926,927 B2 | 8/2005 | Ishida |
| 6,931,177 B2 | 8/2005 | Suzuki et al. |
| 6,934,443 B2 | 8/2005 | Hikichi et al. |
| 6,951,715 B2 | 10/2005 | Cunningham et al. |
| 6,960,528 B2 | 11/2005 | Chen et al. |
| 6,970,247 B2 | 11/2005 | Yankielun |
| 6,979,830 B2 | 12/2005 | Dietz et al. |
| 6,991,939 B2 | 1/2006 | Walt et al. |
| 7,006,741 B1 | 2/2006 | Yu |
| 7,031,566 B2 | 4/2006 | Kochergin et al. |
| 7,057,832 B2 | 6/2006 | Wu |
| 7,060,431 B2 | 6/2006 | Chee et al. |
| 7,150,904 B2 | 12/2006 | D'Urso et al. |
| 7,167,615 B1 | 1/2007 | Wawro et al. |
| 7,167,622 B2 | 1/2007 | Temelkuran et al. |
| 7,258,731 B2 | 8/2007 | D'Urso et al. |
| 7,348,181 B2 | 3/2008 | Walt et al. |
| 7,384,797 B1 | 6/2008 | Blair |
| 7,394,547 B2 | 7/2008 | Tan et al. |
| 7,400,399 B2 | 7/2008 | Wawro et al. |
| 7,405,034 B2 | 7/2008 | Yan et al. |
| 7,421,173 B2 | 9/2008 | Mazur et al. |
| 2001/0029049 A1 | 10/2001 | Walt et al. |
| 2002/0009719 A1 | 1/2002 | Walt et al. |
| 2002/0138049 A1 | 9/2002 | Allen et al. |
| 2002/0142150 A1 | 10/2002 | Baumann et al. |
| 2002/0149584 A1 | 10/2002 | Simpson et al. |
| 2002/0150726 A1 | 10/2002 | Nun et al. |
| 2002/0150909 A1 | 10/2002 | Stuelpnagel et al. |
| 2002/0151245 A1 | 10/2002 | Hoffmann et al. |
| 2002/0154882 A1 | 10/2002 | Moran |
| 2002/0171029 A1 | 11/2002 | Wolff |
| 2002/0176646 A1 | 11/2002 | Wu et al. |
| 2003/0013795 A1 | 1/2003 | Nun et al. |
| 2003/0032204 A1 | 2/2003 | Walt et al. |
| 2003/0044855 A1 | 3/2003 | Anderson et al. |
| 2003/0077058 A1 | 4/2003 | Russell et al. |
| 2003/0094035 A1 | 5/2003 | Mitchell |
| 2003/0104693 A1 | 6/2003 | Siegel et al. |
| 2003/0174992 A1 | 9/2003 | Levene et al. |
| 2003/0207326 A1 | 11/2003 | Su et al. |
| 2003/0230118 A1 | 12/2003 | Dawes et al. |
| 2004/0004779 A1 | 1/2004 | Kochergin et al. |
| 2004/0028875 A1 | 2/2004 | Van Rijn et al. |
| 2004/0045932 A1 | 3/2004 | Kochergin et al. |
| 2004/0063100 A1 | 4/2004 | Wang |
| 2004/0093906 A1 | 5/2004 | Gerstner et al. |
| 2004/0094503 A1 | 5/2004 | Ozeryansky |
| 2004/0242023 A1 | 12/2004 | Yan et al. |
| 2004/0254457 A1 | 12/2004 | Van Der Weide |
| 2005/0013536 A1 | 1/2005 | Walt |
| 2005/0072192 A1 | 4/2005 | Arimondi et al. |
| 2005/0174425 A1 | 8/2005 | Harris |
| 2005/0191774 A1 | 9/2005 | Li et al. |
| 2005/0207713 A1 | 9/2005 | Mazur et al. |
| 2005/0221279 A1 | 10/2005 | Carter et al. |
| 2006/0024478 A1 | 2/2006 | D'Urso et al. |
| 2006/0024508 A1 | 2/2006 | D'Urso et al. |
| 2006/0081394 A1 | 4/2006 | Li et al. |
| 2006/0209301 A1 | 9/2006 | Gardner et al. |
| 2006/0289380 A1 | 12/2006 | D'Urso et al. |
| 2007/0123776 A1 | 5/2007 | Aharoni et al. |
| 2007/0138376 A1 | 6/2007 | Naughton |
| 2007/0154154 A1 | 7/2007 | Falkenstein et al. |
| 2007/0184247 A1 | 8/2007 | Simpson et al. |
| 2007/0281130 A1 | 12/2007 | D'Urso et al. |
| 2008/0026188 A1* | 1/2008 | D'urso et al. ......... B82Y 20/00 428/188 |
| 2008/0296252 A1* | 12/2008 | D'Urso et al. ......... B05D 5/083 216/11 |
| 2011/0128535 A1* | 6/2011 | Baker et al. ............ C03B 32/00 356/301 |
| 2013/0216775 A1* | 8/2013 | Sugiyama et al. .... C03C 17/006 428/138 |

FOREIGN PATENT DOCUMENTS

| | | |
|---|---|---|
| WO | 9964909 | 12/1999 |
| WO | 02098562 | 12/2002 |
| WO | 03013827 | 2/2003 |
| WO | 2005118501 | 12/2005 |
| WO | 2006091235 | 8/2006 |

OTHER PUBLICATIONS

Chang et al., "Nanofiber optic sensor based on the excitation of surface plasmon wave near fiber tip", Journal of Biomedical Optics (2006) 11(1): 014032-1-014032-5.

Erbil et al., "Transformation of a simple plastic into a superhydrophobic surface", Science (2003) 299: 1377-1380.

Kim et al., "Nanostructured surfaces for dramatic reduction of flow resistance in droplet-based microfluidics", IEEE (2002): 479-482.

Krupenkin et al., "From rolling ball to complete wetting: The dynamic tuning of liquids on nanostructured surfaces", Langmuir (2004) 20: 3824-3827.

Litvinova, "Tunable superhydrophobic surfaces fabricated by nanosphere lithography", MRS Bulletin (2004): 229-230.

Liu et al., "Fabrication of anodic-alumina films with custom-designed arrays of nanonchannels", Adv. Mater. (2005) 17(2): 222-225.

(56) References Cited

OTHER PUBLICATIONS

Mazur, "Silica nanowires manipulating light at the nanonscale", LASE Conference (2006) Abstract 6107-21 (Session 5): 97.
McAllister et al., "Microfabricated needles for transdermal delivery of macromolecules and nanoparticles: Fabrication methods and transport studies", PNAS (2003) 100(24): 13755-13760.
McAuley et al., "Silicon micromachining using a high-density plasma source", Institute of Physics Publishing (2001) 34: 2769-2774.
Tong et al., "Modeling of subwavelength-diameter optical wire waveguides for optical sensing applications", Advanced Sensor Systems and Applications II, Proceedings of SPIE (2005) 5634: 416-423.
Tong et al., "Optical silica nanowires for nanophotonics", Materials and Nanotechnology ICO20 (2005) 6029: 60290A-1-60290A-6.
Tong et al., "Submicron and nano-diameter silica wires for optical wave guiding", Nano-Optics and Nano-Structures, Proceedings of SPIE (2002) 4923: 52-58.
Tong et al., "Subwavelength-diameter silica wires for microscale optical components", Optical Components and Materials II, Proc. of SPIE (2005) 5723: 105-112.
Tonucci et al., "Nanochannel array glass", Science (1992) 258: 783-785.

\* cited by examiner

THERMAL HISTORY-BASED ETCHING

STATEMENT REGARDING FEDERALLY SPONSORED RESEARCH OR DEVELOPMENT

The United States Government has rights in this invention pursuant to contract no. DE-AC05-00OR22725 between the United States Department of Energy and UT-Battelle, LLC.

BACKGROUND OF THE INVENTION

1. Field of the Invention

The invention relates generally to glass etching and more specifically to thermal history based glass etching.

2. Description of the Related Art

Differential etching can be used to create glass cone arrays and glass funnel arrays, and micro-channel glass arrays. Differential etching works because different types of glass can have slightly different etch rates because of compositional differences. A need exists for a system and a method for differentially etching glasses having the same composition. In other words, a differential etching technique is needed that does not require the glasses being etched to have different compositions.

BRIEF SUMMARY OF THE INVENTION

Various embodiments relate to a method that can include adjusting an etchability of a first borosilicate glass by heating the first borosilicate glass; combining the first borosilicate glass with a second borosilicate glass to form a composite; and etching the composite with an etchant.

Various embodiments relate to a method including the steps of combining a first borosilicate glass with a second borosilicate glass to form a preform bundle; adjusting a first etchability of the first borosilicate glass and a second etchability of the second borosilicate glass by heating and drawing the preform bundle one or more times to produce a fiber; etching the fiber with an etchant to create a plurality of nanoscale surface features.

Various embodiments relate to a material having a protrusive phase and a recessive phase. The protrusive phase can protrude from the recessive phase to form a plurality of nanoscale surface features. The protrusive phase and the recessive phase can have the same composition. The protrusive phase and the recessive phase can include a borosilicate glass.

BRIEF DESCRIPTION OF THE DRAWINGS

These and other features, aspects, and advantages of the present invention will become better understood with reference to the following description and appended claims, and accompanying drawings where:

Figure 1:
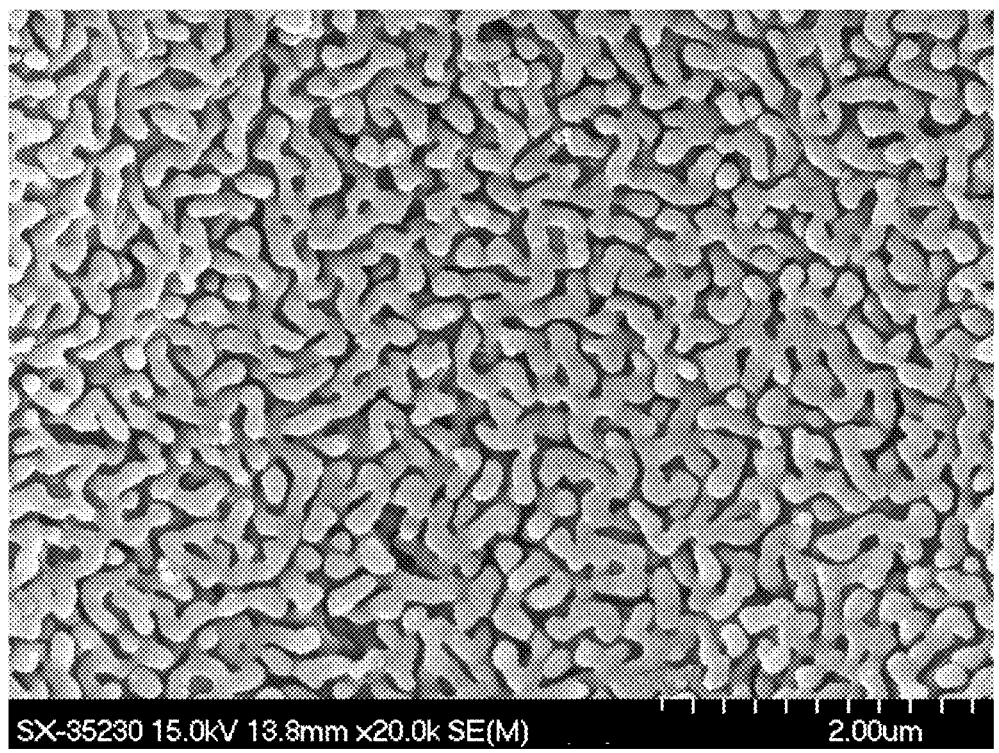
FIG. 1: is a scanning electron microscope (SEM) image showing a spinodally decomposed surface with borate phase removed by etching.

It should be understood that the various embodiments are not limited to the arrangements and instrumentality shown in the drawings.

DETAILED DESCRIPTION OF THE INVENTION

Various embodiments use thermal history based differential etching to form distinct arrays of structures in glass.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

As used herein, the term "etchability" means the rate and/or the extent to which a surface of a material is removed, etched, or dissolved when exposed to a particular condition such as being exposed to an etchant.

As used herein, the term "etchant" means a chemical or a combination of chemicals that can be used to remove, etch, or dissolve a surface of a material.

As used herein, the term "superhydrophobic" refers to a surface that has a contact angle of greater than 150 degrees with a drop of water. A superhydrophobic surface can have a contact angle with a drop of water within a range having a lower limit and/or an upper limit. The range can include or exclude the lower limit and/or the upper limit. The lower limit and/or upper limit can be selected from 150, 150.25, 150.5, 150.75, 151, 151.25, 151.5, 151.75, 152, 152.25, 152.5, 152.75, 153, 153.25, 153.5, 153.75, 154, 154.25, 154.5, 154.75, 155, 155.25, 155.5, 155.75, 156, 156.25, 156.5, 156.75, 157, 157.25, 157.5, 157.75, 158, 158.25, 158.5, 158.75, 159, 159.25, 159.5, 159.75, 160, 160.25, 160.5, 160.75, 161, 161.25, 161.5, 161.75, 162, 162.25, 162.5, 162.75, 163, 163.25, 163.5, 163.75, 164, 164.25, 164.5, 164.75, 165, 165.25, 165.5, 165.75, 166, 166.25, 166.5, 166.75, 167, 167.25, 167.5, 167.75, 168, 168.25, 168.5, 168.75, 169, 169.25, 169.5, 169.75, 170, 170.25, 170.5, 170.75, 171, 171.25, 171.5, 171.75, 172, 172.25, 172.5, 172.75, 173, 173.25, 173.5, 173.75, 174, 174.25, 174.5, 174.75, 175, 175.25, 175.5, 175.75, 176, 176.25, 176.5, 176.75, 177, 177.25, 177.5, 177.75, 178, 178.25, 178.5, 178.75, 179, 179.25, 179.5, 179.75, and 180 degrees. For example, according to certain preferred embodiments, a superhydrophobic surface can have a contact angle with a drop of water of from 150 to 180 degrees.

As used herein, the term "nanoscale" means of a size measurable in nanometers or microns.

As used herein, the terms "protrusive phase" and "recessive phase" can refer to materials having the same or different compositions. The recessive phase has a higher susceptibility to a preselected etchant than the protrusive phase; and treating a surface of a composite body comprising both the recessive phase and the protrusive phase with the preselected etchant can result in the protrusive phase protruding from the surface to form a sharp, possibly nanoscale, surface feature, while the recessive phase can define a recessed surface area between the surface features.

Various embodiments relate to superhydrophobic surfaces and more specifically to articles and methods for creating micron and nanometer-scale glass structures that include structured glass arrays using inexpensive glass, such as sodium borosilicate, in a simple manufacturing process. The formed glass array structures can be tailored to an approximately circularly-symmetric shape including cones, rods, holes, funnels, or concentric rings. For purposes of the present disclosure, a three-dimensional structure exhibits "circular symmetry" when for any horizontal cross section taken along the vertical height of the three-dimensional structure, all points along a perimeter of the horizontal cross section are approximately equidistant from a central point of the horizontal cross section. A perfect geometric cone or cylinder, for example would exhibit perfect circular symmetry. Since the geometric shape of individual members of a glass array structure produced according to various embodiments will inevitably vary, the term "circular symmetry" does not require absolute geometric precision and includes natural variations in the geometric shape. On any given horizontal cross section of an individual member of a glass array structure according to the present invention the distance from any point along the perimeter of the horizontal cross section to the central point of the horizontal cross section can vary relative to other points along the perimeter of the horizontal cross section to the central point of the horizontal cross section by a percentage within a range having a lower limit and/or an upper limit. The range can include or exclude the lower limit and/or the upper limit. The lower limit and/or upper limit can be selected from 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, and 20%. For example, according to certain preferred embodiments, on any given horizontal cross section of an individual member of a glass array structure according to the present invention the distance from any point along the perimeter of the horizontal cross section to the central point of the horizontal cross section can vary relative to other points along the perimeter of the horizontal cross section to the central point of the horizontal cross section by a percentage of from 0 to 10%.

The size and scale of the formed glass array structures is only limited by the amount of processing done, such as a number of optical fiber drawing steps, and the particular type of glass used. For example, each fiber drawing step can make the individual glass strands in the glass fiber bundle thinner and more closely packed.

In one embodiment a composite material is composed of at least one core and at least one matrix or cladding material. Prior to etching, the core and the matrix can be bundled into an aligned array (hereafter referred to as a bundle). In one embodiment, the matrix has a multi-sided, e.g., hexagonal, cross-sectional shape to minimize voids while the core has a circular cross-section. In another embodiment, the matrix has a circular cross-section. In one embodiment, the matrix material and core material comprise the same material, but have a different thermal history, providing differential etching rates.

In one embodiment, the bundle can be heated to a temperature sufficient to soften the materials comprising the bundle, but low enough to avoid damage, decomposition, or other deleterious changes. In one embodiment, the temperature of the glass should be heated to the glass transition temperature (Tg). In one embodiment, the bundle is then drawn along the axis of the bundled rods to fuse and reduce the diameter of the bundle. In one embodiment, the drawn bundle has reduced size matrix material and core material.

The drawn bundle can be cut transversely into sections that can be re-bundled to increase the number of core material cores in the cross-section thereof. In a following process step, the bundle can then be drawn again. In one embodiment, it is noted that a twice-drawn bundle has further reduced size matrix material and core material. The twice-drawn bundle may then be cut transversely into sections that are re-bundled to further increase the number of cores in the cross-section thereof. It is noted that the process of bundling, drawing, and cutting can be performed a single time or repeated many times until the desired diameter and spacing of the core material is obtained.

In one embodiment, after the final draw (which may be the first draw), the bundle can be cut, bundled, and fused in order to obtain a larger diameter bundle. Thereafter, the bundle can be transversely cut to produce slices (plates, tiles) of any desired thickness.

Subsequently, in one embodiment, one or both of the cut (composite) surfaces of the bundle are etched to create an array of sharp features composed of core material on one or both sides of the cut bundle. The composite surface can be contacted with an etchant, (hydrofluoric acid, HF, for example), which etches the matrix material (recessive component) faster than the core material (protrusive component) or vice versa, based on their thermal history. The etching continues until the matrix material or the core material is etched back to the desired depth, leaving some of the other material protruding from the surface.

Borosilicates are a particularly preferred type of glass for use in various embodiments of the invention. Borosilicates are composed of borate glass and silica glass. In general, the etch rate of a borosilicate is directly related to the amount of borate. More specifically, the higher weight percent of borate in the borosilicate, the higher the etch rate. An exemplary sodium borosilicate glass can include 65.9 wt-% $SiO_2$, 26.3 wt-% $B_2O_3$ and 7.8 wt-% $Na_2O$, which can spinodally decompose into two glass phases when heat treated to above 690 degrees Celsius. Another exemplary sodium borate glass is the more common Schott™ 8330 glass (DURAN®) containing 81 wt % $SiO_2$, 13 wt % $B_2O_3$, 4 wt % $Na_2O+K_2$ and 2 wt % $Al_2O_3$. Schott™ 8330 glass does not spinodally decompose. Instead it produces borate nucleation (areas of borate surrounded by silica), when completely phase separated.

A representative borosilicate glass includes a borosilicate glass composition. The borosilicate glass composition includes silicon dioxide ($SiO_2$) in a range from about 60% to 90% by total composition weight; boric oxide ($B_2O_3$) in a range from about 9% to 25% by total composition weight; aluminum oxide ($Al_2O_3$) in a range from about 1% to 17% by total composition weight; and at least one alkali oxide in a range from about 2% to 8% by total composition weight. In addition, the borosilicate glass has a coefficient of thermal expansion (CTE) that is in a range between about $30 \times 10^{-7}$/degree Celsius. and $55 \times 10^{-7}$/degree Celsius. Furthermore, the borosilicate glass composition resists devitrification upon sintering without the addition of an inhibitor oxide.

A representative method of making a borosilicate glass includes forming a homogeneous mixture by mixing a plurality of components. The components of the homogeneous mixture include silicon dioxide ($SiO_2$) in a range from about 60% to 90% by total composition weight, boric oxide ($B_2O_3$) in a range from about 9% to 25% by total composition weight, aluminum oxide ($Al_2O_3$) in a range from about 1% to 17% by total composition weight, and at least one alkali oxide in a range from about 2% to 8% by total composition weight. Next the method includes melting the homogeneous mixture; and sintering the homogeneous mixture forming a borosilicate glass. The borosilicate glass has a coefficient of thermal expansion (CTE) that is in a range between about $30 \times 10^{-7}$/degree Celsius. and $55 \times 10^{-7}$/degree Celsius. In addition, the homogeneous mixture resists devitrification upon sintering without the addition of an inhibitor oxide.

The presence of sodium in a sodium borosilicate glass can promote borate migration. In other words, the presence of sodium increases the speed and amount of borate phase change. Without wishing to be bound by theory, it is believed that this is because the sodium etches very quickly itself and also acts as a flux in the migration or phase change process.

Most borosilicates do not spinodally decompose. According to various embodiments, it was unexpectedly discovered that the thermal history of borosilicates can greatly affect its etch rate. For instance, if, during heating, the borate glass becomes surrounded by silica glass (nucleates), the overall etch rate will greatly decrease. On the other hand, if the silica phase becomes surrounded by borate glass, its etch rate greatly increases. It was also observed that the presence of a flux material like sodium can greatly increase the rate of phase separation during heating. Therefore, when borate glasses are heated, their etch rates, depending on composition and thermal history, can increase or decrease. This phenomenon can be exploited to achieve the desired differential etch rates according to various embodiments relating to thermal history etching of borosilicate glasses.

The etch rate of borosilicate glass using an acid like hydrofluoric acid (HF) depends on a variety of things, including HF concentration, etchant temperature, glass composition, and, as unexpectedly discovered, glass thermal history and amount of sodium. Without wishing to be bound by theory, the reason thermal history is a variable has to do with the fact that borosilicate glasses have two glass phases (a borate phase and a silica phase) that, when heated, phase separate, to a certain extent. The type and amount of total phase separation depends on the glass composition, sodium (flux) content and thermal history of the glass. In general, the more thermal energy (heat) these glasses have been exposed to, the more phase separation these glasses will have. Phase separation can dramatically change the glass etch rate. Depending on the glass composition, this increase in phase separation can either increase or decrease the etch rate. Even if both glasses are increasing their etch rates, if one is increased faster than the other, their differential etch rates can still dramatically change.

Borosilicate glasses can phase separate in three different ways, depending on the particular glass composition of interest, i.e. percentages of borate vs. silica. If the glass composition is borate rich, i.e., if it has a high percentage of borate, it will phase separate such that small pockets of silica will be surrounded by regions of borate; a phenomenon called silica nucleation. Since HF etches borate very quickly, the overall glass etch rate will increase quickly as phase separation increases. If the glass composition is silica rich, i.e. it has a high percentage of silica, it will phase separate such that small pockets of borate will be surrounded by regions of silica; a phenomenon called borate nucleation. Since HF etches silica very slowly, the overall glass etch rate will decrease as phase separation increases. If neither the silica nor the borate concentrations dominate, i.e. the associated Gibbs free energy is metastable, phase separation will produce spinodal decomposition, and both phases will stay interconnected with ever larger features as phase separation proceeds. In the case of spinodal decomposition, the etch rate of the glass tends to gradually increase with increasing phase separation.

For comparison, FIG. 1 shows an SEM image of a spinodally decomposed surface with borate phase removed by etching.

When two borosilicate glasses, such as a rod disposed within a tube are drawn, the resulting composite etch rates of the two glasses and the associated aspect ratio of etched cones is a function of the differential etch rate, i.e., the etch rate difference between the two glasses, which is a function of the thermal history of the two glasses. Because of the different glass compositions of these composite borosilicate glasses, heat treating these composites will generally change the differential etch rate and thus change the resultant etched cone aspect ratio.

While the variability of differential etch rates, as a function of thermal history, make it difficult to establish a simple recipe for the creation of a particular cone aspect ratio from batch to batch, it also provides an opportunity to use and control this etch rate variability to make some unique and very interesting structures. For instance, keeping all the other variables the same, except the pre-heating of one of the two drawn glasses, it is possible to dramatically increase or decrease the resultant cone array aspect ratios especially if one glass is phase changing faster than the other, or even make the aspect ratio go negative, i.e. the relative etch rates of the two glasses flips, making the more etchable glass, less etchable and the less etchable glass more etchable. In the case of negative aspect ratios, instead of cones, differential etching can produce holes or funnels.

Figure 5:
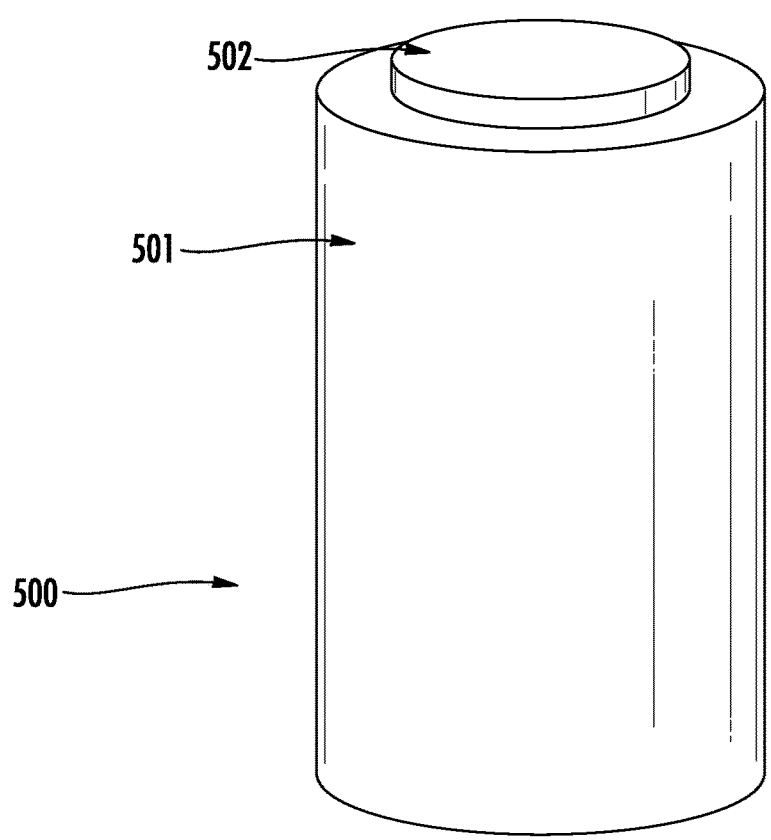
FIG. 5: is a schematic diagram showing an etched drawn fiber with a pre-heat treated cladding.

FIG. 5 is a schematic diagram showing a single borosilicate glass structure 500, such as an etched drawn fiber, isolated from a surrounding array of similar glass structures. The single structure 500 includes a tube cladding 501 and a core 502. As shown in FIG. 5, the tube cladding 501 was pre-heat treated and etched more quickly than the core 502.

Figure 6:
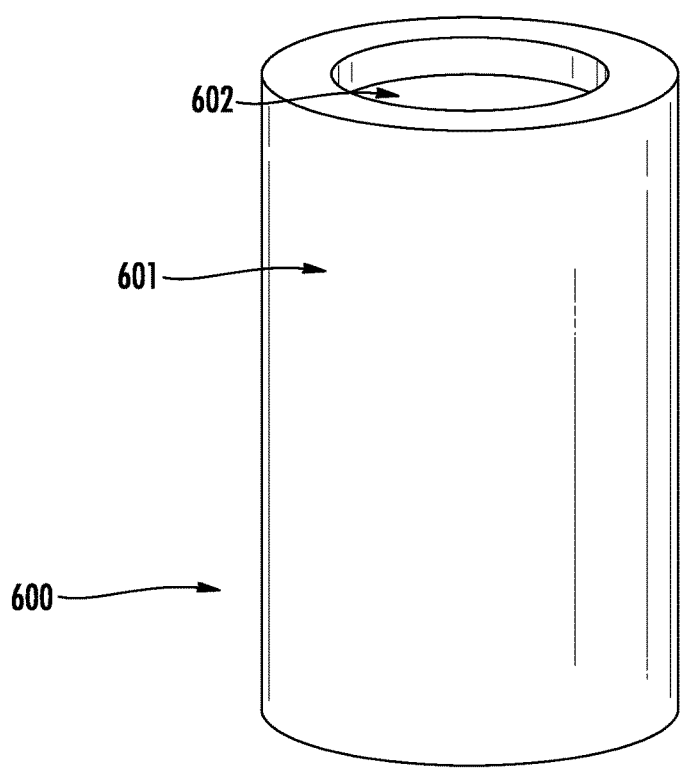
FIG. 6: is a schematic diagram showing an etched drawn fiber, with a pre-heat treated core.

FIG. 6 is a schematic diagram showing a single borosilicate glass structure 600, such as an etched drawn fiber, isolated from a surrounding array of similar glass structures. The single structure 600 includes a tube cladding 601 and a core 602. As shown in FIG. 6, the core 602 was pre-heat treated and etched more quickly than the tube cladding 601.

Figure 7:
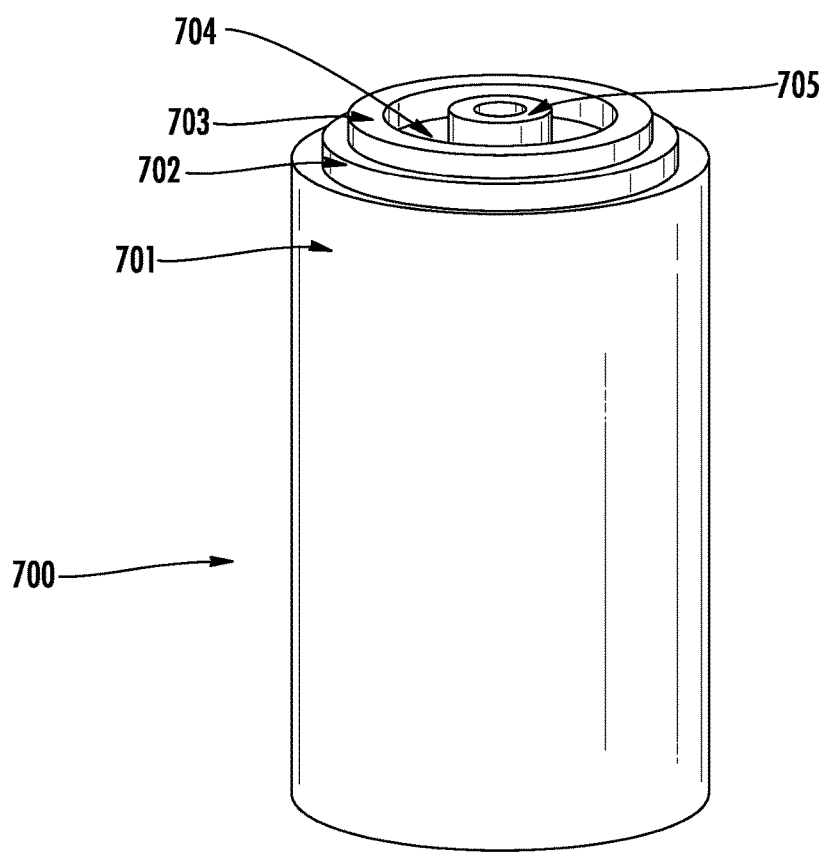
FIG. 7: is a schematic diagram showing an etched drawn fiber having a variety of differently heat-treated layers.

FIG. 7 is a schematic diagram showing a single borosilicate glass structure 700, such as an etched drawn fiber, isolated from a surrounding array of similar glass structures. The single structure 700 includes a tube cladding 701 and a plurality of core layers 702, 703, 704, and 705. As shown in FIG. 7, the tube cladding 701 and the core layers 702, 703, 704, and 705 was pre-heat treated differently to produce a multilevel structure via etching.

Figure 8:
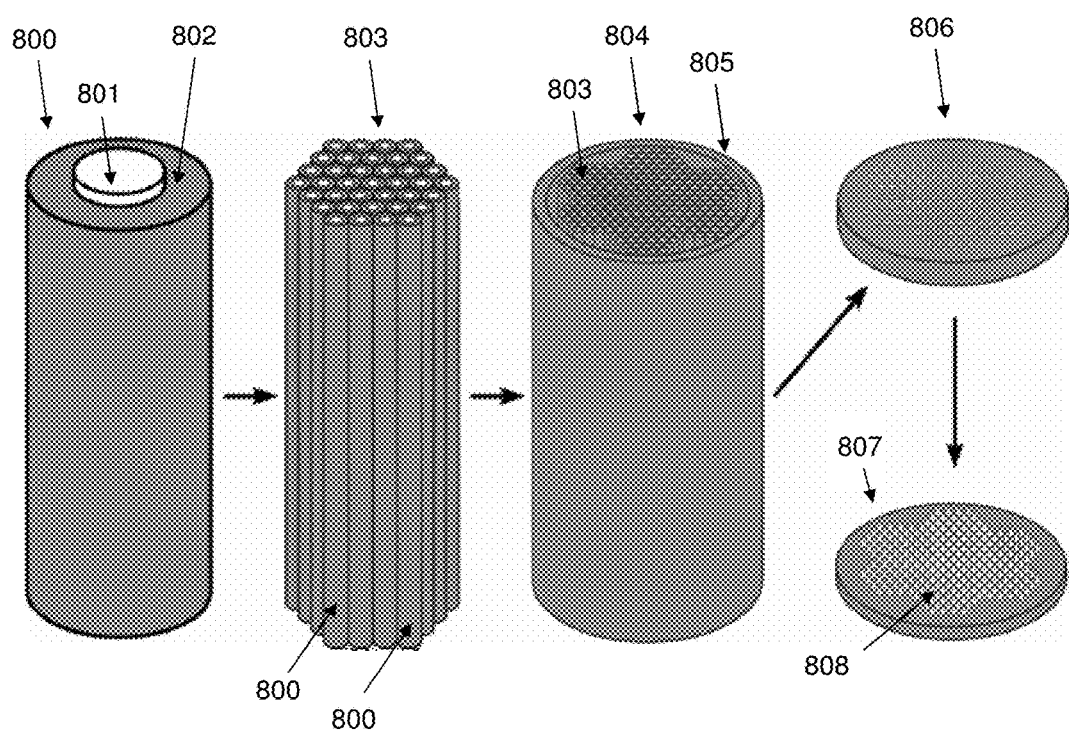
FIG. 8: is a schematic diagram illustrating steps according to various method embodiments.

FIG. 8 is a schematic diagram showing steps according to various method embodiments. A single glass composite structure 800 can include a core 801 and a shell 802. The core 801 and the shell 802 can comprise glasses that are identical or different. The core 801 and/or the shell 802 can comprise any other material. A plurality of glass composite structures 800 can be bundled together to form a preform bundle 803. The preform bundle 803 can be have a hexagonal shape. The preform bundle 803 can be drawn one or more times. After being drawn, a plurality of drawn preform bundles 803 can be bundled to form a second bundle 804. The second bundle 804 can optionally be placed within an outer shell 805. The outer shell 805 can include a glass material that is the same or different than the core 801 and the shell 802. The outer shell 805 can comprise any other material. The second bundle 804 can optionally be drawn one or more times. Subsequently the second bundle 804 can be sliced into a plurality of wafers 806. The wafers 806 can be exposed to an etchant, such as hydrofluoric acid (HF) to form an array 807 comprising a plurality of surface features 808. The plurality of surface features 808 can include nanoscale peaks, ridges, cones, rods, and/or funnels.

Figure 11:
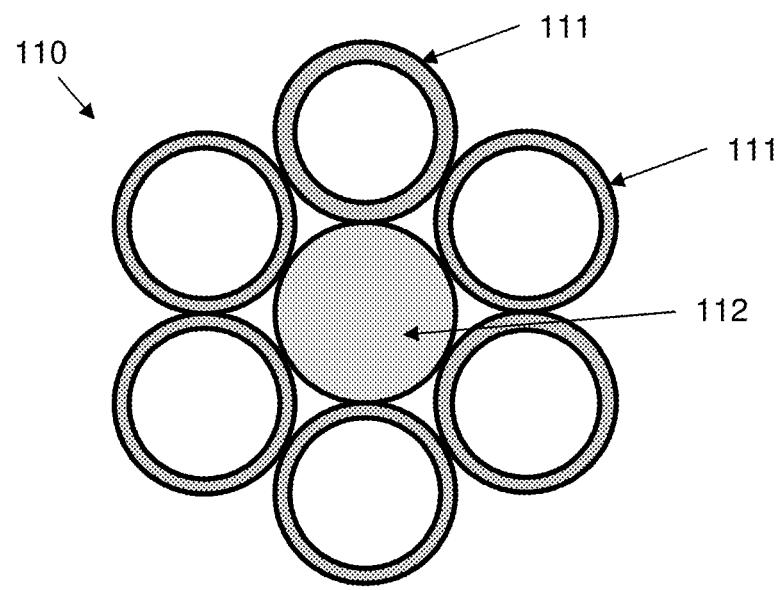
FIG. 11: is a schematic illustration of one preform bundle.

Referring to FIG. 11, a preform bundle 110 is shown. The preform bundle 110 comprises a plurality of tubes 111 encircling a central rod 112. The tubes 111 and the rod 112 can comprise the same or different borosilicate glass or other material. The preform bundle 110 could be disposed within a larger tube (not shown) as illustrated in FIG. 12.

Figure 12:
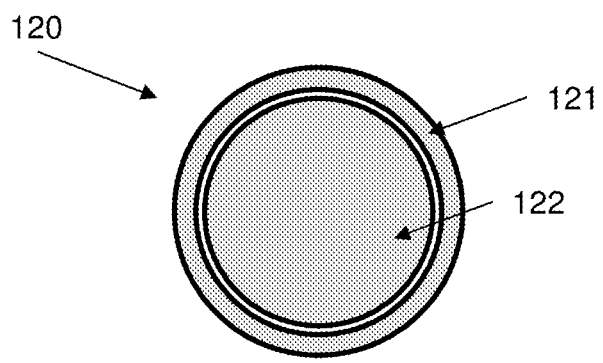
FIG. 12: is a schematic illustration of another preform bundle.

Referring to FIG. 12, a preform bundle 120 is shown. The preform bundle 120 comprises a tube 121 and a rod 122 disposed within a central portion of the tube 121. Additional tubes (not shown) could encircle this structure as shown in FIG. 11 and/or the preform bundle 120 could be disposed within a larger tube (not shown).

As described, various embodiments relate to a method that can include adjusting an etchability of a first borosilicate glass by heating the first borosilicate glass; combining the first borosilicate glass with a second borosilicate glass to form a composite; and etching the composite with an etchant. The adjusting step can further include drawing the first borosilicate glass. The etchant can be hydrofluoric acid, hydrofluoric acid buffered with ammonium fluoride, hydrofluorosilic acid, and combinations thereof. Various concentrations of etchant can be employed.

According to some embodiments, after the adjusting step the etchability of the first borosilicate glass can be the same as a second etchability of the second borosilicate glass. According to other embodiments, after the adjusting step the etchability of the first borosilicate glass is greater than a second etchability of the second borosilicate glass. According to other embodiments, after the adjusting step the etchability of the first borosilicate glass is less than a second etchability of the second borosilicate glass.

The first borosilicate glass and the second borosilicate glass can have the same composition. The first borosilicate glass and the second borosilicate glass can have different compositions.

During the adjusting step the first borosilicate glass can be exposed to a temperature between a softening point of the first borosilicate glass and a melting point of the borosilicate glass. For example, during the adjusting step the first borosilicate glass can be exposed to a temperature within a range having a lower limit and/or an upper limit. The range can include or exclude the lower limit and/or the upper limit. The lower limit and/or upper limit can be selected from 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, and 1000 degrees Celsius. For example, according to certain preferred embodiments, during the adjusting step the first borosilicate glass can be exposed to a temperature of from 800 to 900 degrees Celsius.

The first borosilicate glass can be exposed to the temperature for a time period within a range having a lower limit and/or an upper limit. The range can include or exclude the lower limit and/or the upper limit. The lower limit and/or upper limit can be selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, and 120 minutes. For example, according to certain preferred embodiments, the first borosilicate glass can be exposed to the temperature for a time period of from 20 to 40 minutes.

Various embodiments relate to a method including the steps of combining a first borosilicate glass with a second borosilicate glass to form a preform bundle; adjusting a first etchability of the first borosilicate glass and a second etchability of the second borosilicate glass by heating and drawing the preform bundle one or more times to produce a fiber; etching the fiber with an etchant to create a plurality of nanoscale surface features.

The first borosilicate glass can include a plurality of rods, and the second borosilicate glass can include a plurality of tubes. One or more of the plurality of rods can be disposed within a central portion of the one or more of the plurality of tubes. One or more of the plurality of rods can be encircled by a plurality of the plurality of tubes.

The preform bundle can have a thickness within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, and 12 inches. For example, according to certain preferred embodiments, the preform bundle can have a thickness of from 1-2 inches.

The preform bundle can have a length within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, 2, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.2, 2.21, 2.22, 2.23, 2.24, 2.25, 2.26, 2.27, 2.28, 2.29, 2.3, 2.31, 2.32, 2.33, 2.34, 2.35, 2.36, 2.37, 2.38, 2.39, 2.4, 2.41, 2.42, 2.43, 2.44, 2.45, 2.46, 2.47, 2.48, 2.49, and 2.5. For example, according to certain preferred embodiments, the preform bundle can have a length of from 1 to 1.5 meters.

The adjusting step can include passing the preform bundle through a furnace at a temperature within a range having a lower limit and/or an upper limit. The range can include or exclude the lower limit and/or the upper limit. The lower limit and/or upper limit can be selected from 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, and 1000 degrees Celsius. For example, according to certain preferred embodiments, the adjusting step can include passing the preform bundle through a furnace at a temperature of from 800 to 900 degrees Celsius.

The preform bundle can be passed through the furnace at a rate within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, and 10 mm/min. For example, according to certain preferred embodiments, the preform bundle can be passed through the furnace at a rate of from 0.5 to 3 mm/min.

The preform bundle can have a residence time in the furnace within a range having a lower limit and/or an upper limit. The range can include or exclude the lower limit and/or the upper limit. The lower limit and/or upper limit can be selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 minutes. For example, according to certain preferred embodiments, the preform bundle can have a residence time in the furnace of from 20 to 40 minutes.

The adjusting step can further include pulling the preform bundle out of the furnace at a rate within a range having a lower limit and/or an upper limit. The range can include or exclude the lower limit and/or the upper limit. The lower limit and/or upper limit can be selected from 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, and 20 m/min. For example, according to certain preferred embodiments, the adjusting step can further include pulling the preform bundle out of the furnace at a rate of from 2-8 m/min.

Pulling the preform bundle out of the furnace can produce a fiber having a thickness within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, and 10 mm. For example, according to certain preferred embodiments, pulling the preform bundle out of the furnace can produce a fiber having a thickness of 0.5 to 1 mm.

The method can further include a step of cutting the fiber into a plurality of fiber lengths. Each length of fiber can have a length within a range having a lower limit and/or an upper limit. The range can include or exclude the lower limit and/or the upper limit. The lower limit and/or upper limit can be selected from 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, and 1000 mm. For example, according to certain preferred embodiments, each length of fiber can have a length of from 500 to 700 mm. The method can further include bundling the plurality of fiber lengths into a fiber bundle prior to etching. The method can further include slicing the fiber bundle to form a wafer prior to etching.

Various embodiments relate to a material having a protrusive phase and a recessive phase. The protrusive phase can protrude from the recessive phase to form a plurality of nanoscale surface features. The protrusive phase and the recessive phase can have the same composition. The protrusive phase and the recessive phase can include a borosilicate glass. The plurality of nanoscale surface features can include a plurality of peaks and ridges each having a length, a width, a height, and a spacing from one to the next within a range having a lower limit and/or an upper limit. The range can include or exclude the lower limit and/or the upper limit. The lower limit and/or upper limit can be selected from 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, 1000, 1100, 1200, 1300, 1400, 1500, 1600, 1700, 1800, 1900, and 2000 nm. For example, according to certain preferred embodiments, the plurality of nanoscale surface features can include a plurality of peaks and ridges each having a length, a width, a height, and a spacing from one to the next of from 1 nm to 1000 nm. The length, the width, the height, and the spacing dimensions can be the same or different and can be selected independently of each other.

The nanoscale surface features can cover percentage of the surface of the material within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 percent. For example, according to certain preferred embodiments, the nanoscale surface features can cover percentage of the surface of the material of from 1 to 50 percent.

Since various embodiments relate to drawing and bundling these glasses, these embodiments could create an ordered array of concentric or circularly symmetric nanofeatures. Additionally or alternatively, if different dimensions of the same glasses were bundled together multi-scale, multi-dimensional nanostructures can be created. Drawn hollow tubes for instance can be employed.

The invention is further described in the following illustrative examples in which all parts and percentages are by weight unless otherwise indicated.

EXAMPLES

Materials

Schott™ 8330 glass and Schott™ 8487 glass were used in the following Examples. These glasses are commercially available from SCHOTT North America, Inc. Corporate Office, 555 Taxter Road, Elmsford, N.Y. 10523. Table 1 provides a basic composition of the two glasses. Schott™ 8330 glass and Schott™ 8487 glass are both borosilicate glasses and are commercially available in tubes, capillaries, and rods.

TABLE 1

| Material | Glass A (8330 Glass) Weight Percent | Glass B (8487 Glass) Weight Percent |
| --- | --- | --- |
| $SiO_2$ | 81 | 75 |
| $B_2O_3$ | 13 | 17 |
| $Na_2O + K_2O$ | 4 | 6 |

Schott™ 8330 glass has the physical properties specified in Table 2.

TABLE 2

| Physical Property | Value | Unit |
| --- | --- | --- |
| Coefficient of mean linear thermal expansion α(20° C., 300° C.) (ISO 7991) | 3.3 | $10^{-6} K^{-1}$ |
| Transformation temperature T g (ISO 7884-8) | | |
| Glass Temperature at viscosity η in dPa s | 3.3 | ° C. |
| $10^{13}$ (annealing point) (ISO 7884-4) | 560 | ° C. |
| $10^{7.6}$ (softening point) (ISO 7884-3) | 825 | ° C. |
| $10^4$ (working point) (ISO 7884-2) | 1260 | ° C. |
| Stress-optical coefficient K (DIN 7884-2) | 4 | $10^{-6} mm^2 \cdot N^{-1}$ |
| Density ρ at 25° C. | 2.23 | $g \cdot cm^{-3}$ |
| Modulus of elasticity E (Young's modulus) | 63 | $10^3 N \cdot mm^{-2}$ |
| Poisson's ratio μ | 0.2 | |
| Thermal conductivity λ w at 90° C. | 1.2 | $W \cdot m^{-1} \cdot K{-1}$ |
| Log of the electric volume resistivity (Ω · cm) | | |
| at 250° C. | 8 | Ω · cm |
| at 350° C. | 6.5 | Ω · cm |
| Dielectric constant ∈ 1 MHz at 25° C. | 4.6 | |
| Dielectric loss factor tan Õ for 1 MHz at 25° C. | $37 \times 10^{-4}$ | |
| Refractive index nd (λ = 587.6 nm) | 1.473 | |

Schott™ 8330 glass has the chemical resistant properties specified in Table 3.

TABLE 3

| Chemical Resistance Property | Class |
| --- | --- |
| Hydrolytic resistance (ISO 719) | HGB 1 |
| Acid resistance (DIN 12116) | S 1 |
| Alkali resistance (ISO 695) | A 2 |

Schott™ 8487 glass has the physical properties specified in Table 4.

TABLE 4

| Physical Property | Value | Unit |
| --- | --- | --- |
| Coefficient of mean linear thermal expansion α(20° C., 300° C.) (ISO 7991) | 3.9 | $10^{-6} K^{-1}$ |
| Transformation temperature T g (ISO 7884-8) | 525 | ° C. |
| Glass temperature at viscosity η in dPa s | | |
| $10^{13}$ (annealing point) (ISO 7884-4) | 560 | ° C. |
| $10^{7.6}$ (softening point) (ISO 7884-3) | 775 | ° C. |
| $10^4$ (working point) (ISO 7884-2) | 1135 | ° C. |
| Stress-optical coefficient K (DIN 52314) | 3.6 | $10^{-6} mm^2 N \cdot^{-1}$ |
| Density ρ at 25° C. | 2.25 | $g \cdot cm^{-3}$ |
| Modulus of elasticity E (Young's modulus) | 66 | $10^3 N \cdot mm^{-2}$ |
| Poisson's ratio μ | 0.2 | |
| Thermal conductivity λw at 90° C. | 1.2 | $W \cdot m^{-1} \cdot K^{-1}$ |
| Log of the electric volume resistivity (Ω · cm) | | |
| at 250° C. | 8.3 | Ω · cm |

TABLE 4-continued

| Physical Property | Value | Unit |
| --- | --- | --- |
| at 350° C. | | |
| Dielectic constant ∈ 1 MHz at 25° C. | 6.9 | Ω·cm |
| Dielectic loss factor tan Õ for 1 MHz at 25° C. | 4.9 | |
| | $36 \times 10^{-4}$ | |
| Refractive index nd (λ = 587.6 nm) | 1.479 | |

Schott™ 8487 glass has the chemical resistant properties specified in Table 5.

TABLE 5

| Chemical Resistance Property | Class |
| --- | --- |
| Hydrolytic resistance (ISO 719) | HGB 4 |
| Acid resistance (DIN 12116) | S 3 |
| Alkali resistance (ISO 695) | A 3 |

Examples 1 and 2 demonstrate how various embodiments use heat treatment to form a specific surface structure. Both examples use the same borosilicate glasses (drawn rod and tube). The only difference is the thermal history of the glasses.

Example 1

One purpose of this example is to demonstrate that the size and scale of formed glass array structures created according to various embodiments of the invention can be controlled depending on the number of fiber drawing steps. In this example, preform bundles were first created. The preform bundles included two borosilicate glasses. More specifically, each preform bundle comprised a plurality of composite glass rod structures. Each composite glass rod structure had a Schott™ 8330 core surrounded by a Schott™ 8487 matrix. Each preform bundle was about 1 to 2 inches thick and about 1 to 1.5 meters long. Each preform bundle included about 2000 composite rod structures. Generally, a preform bundle can include from 1000 to 3000, from 1500 to 2000, from 2000 to 2500, or from 2500 to 3000 individual previously drawn fibers. The amount of rod structures per bundle can be the product of the number of fibers of each draw. e.g. if the first bundled draw contained 1000 fibers and the second bundled draw contained 1000 fibers, the total number of composite rod structures would be 1,000,000 and a third bundled draw of 1000 fibers would produce 1 billion composite rod structures.

Typically, without any prior discernable phase separation, 8330 glass etches more slowly than the 8487 glass. Without wishing to be bound by theory, it is believed that the 8330 glass etches more slowly due to its higher silica content and lower borate content. This etch rate difference was confirmed by our own etch rate analysis of these two glasses where we observed that 8487 etched 5 times faster than 8330. Given that etch rate, it was estimated that aspect ratios of approximately 10:1 cone height to base (h/b) would be produced.

Figure 9:
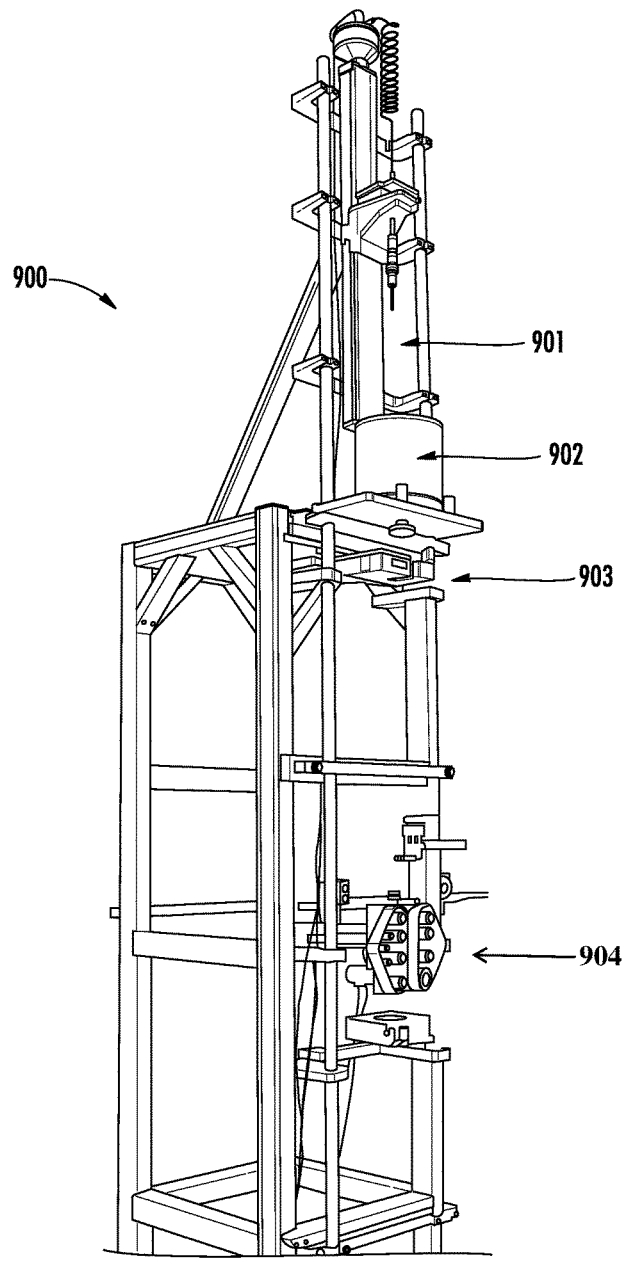
FIG. 9: is a photograph of an apparatus employed in various method embodiments.
Figure 10:
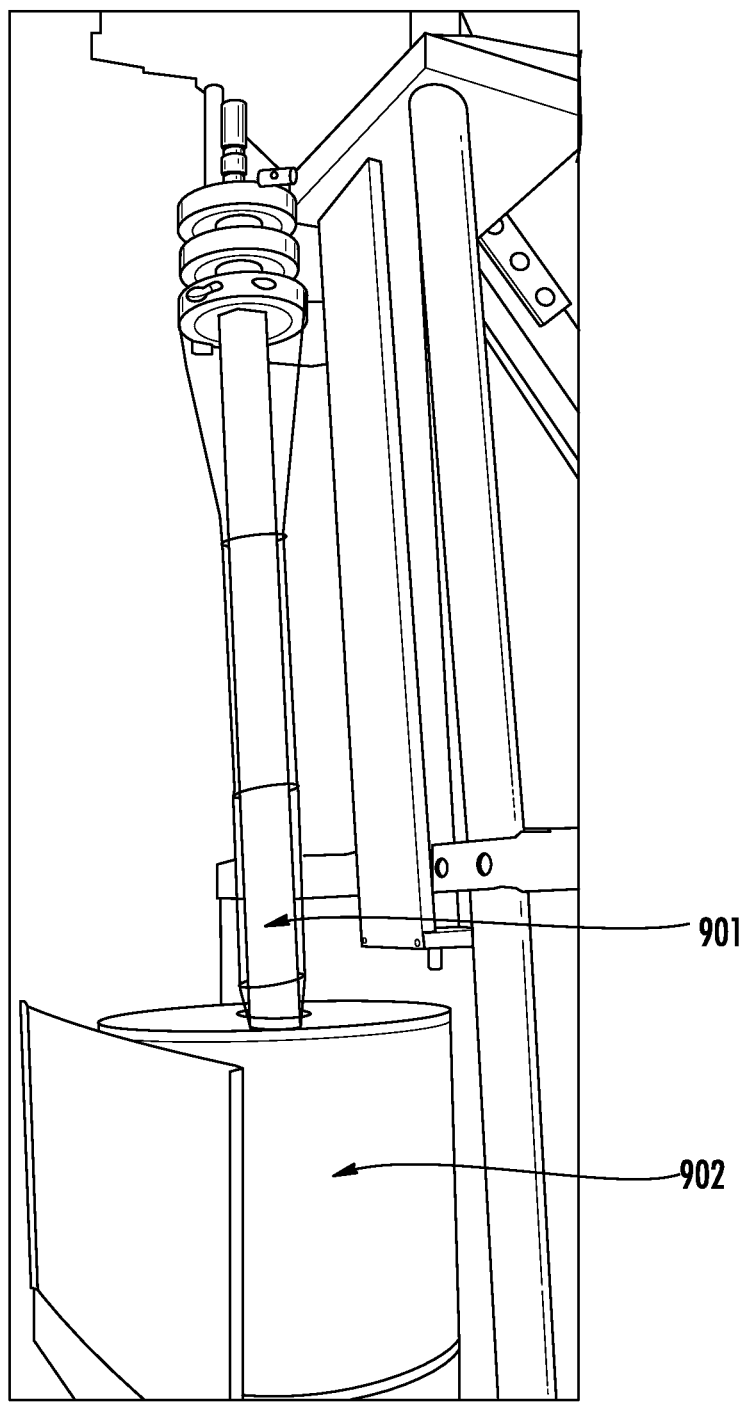
FIG. 10: is a photograph of an apparatus employed in various method embodiments.

The apparatus 900 shown in FIGS. 9 and 10 was employed to draw the preform bundles in a consistent manner. For each draw, a preform bundle 901 was fed into a pass-through furnace 902 at a rate of about 1 mm/min. The preform bundle 901 was heated at 850 degrees Celsius in the pass-through furnace 902. The preform bundle 901 had a residence time in the pass-through furnace 902 of about 30 minutes. The heated glass exiting the pass-through furnace 902 was pulled by puller 903 at a rate of about 2 to 8 meters per minute to form a drawn fiber having a thickness of about 0.5 to 1 mm. The drawn fiber was then cut into a plurality of 600 mm lengths. For repeated draws, the plurality of drawn fiber lengths were bundled and the process was repeated using the bundle of fiber lengths in place of the preform bundle.

Once the one or more drawing steps were completed, the resulting drawn fiber was cut into a wafer and etched in the presence of a 5% solution of hydrofluoric acid (HF). The etch time was not critical in that once the composite structure had etched the core glass 8330 into a cone, further etching does not change the cone shape or aspect ratio. Additional etching simply etched more glass, much like a pencil sharpener does not change the shape or size of the sharpened point with additional sharpening. The minimum amount of etching time required is strictly a function of the time needed to form the cones, or funnels. The smaller the features (cones or funnels) the less etching time required. A wafer formed from a three drawn glass bundle requires just over two hours of etching, while a wafer from a four drawn glass bundle only requires 15 minutes of etching to fully form the cone or funnel.

Figure 2A:
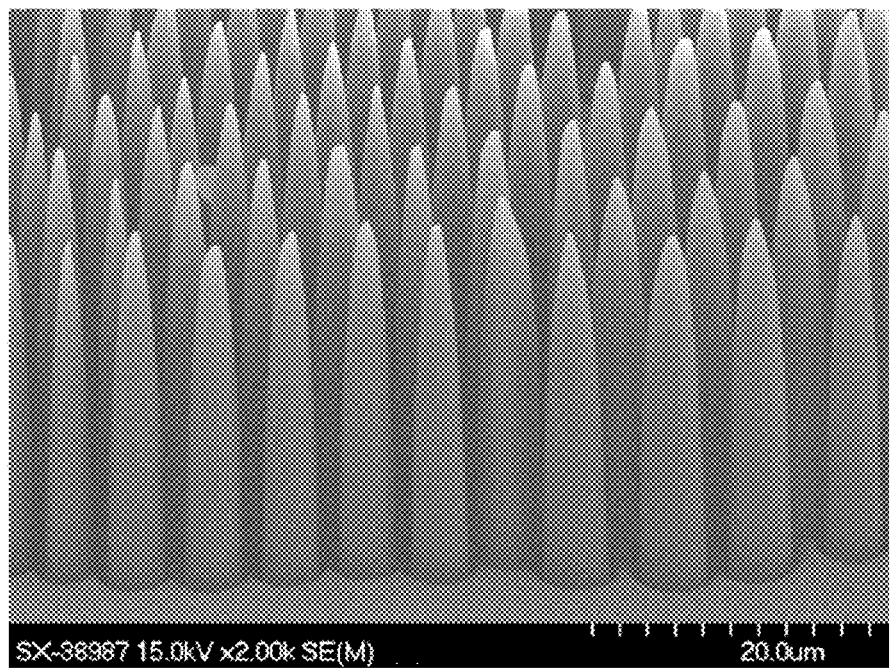
FIGS. 2a-b: are SEM images of borosilicate glasses etched according to embodiments of the invention, showing that the size and scale of the formed glass array structures depends on the number of fiber drawing steps.
Figure 2B:
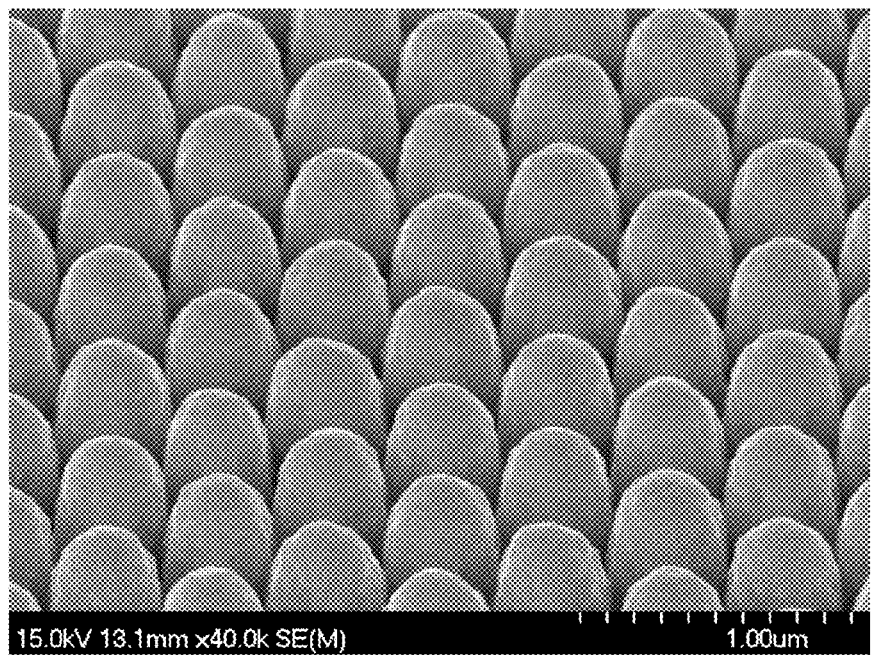
Figure 3A:
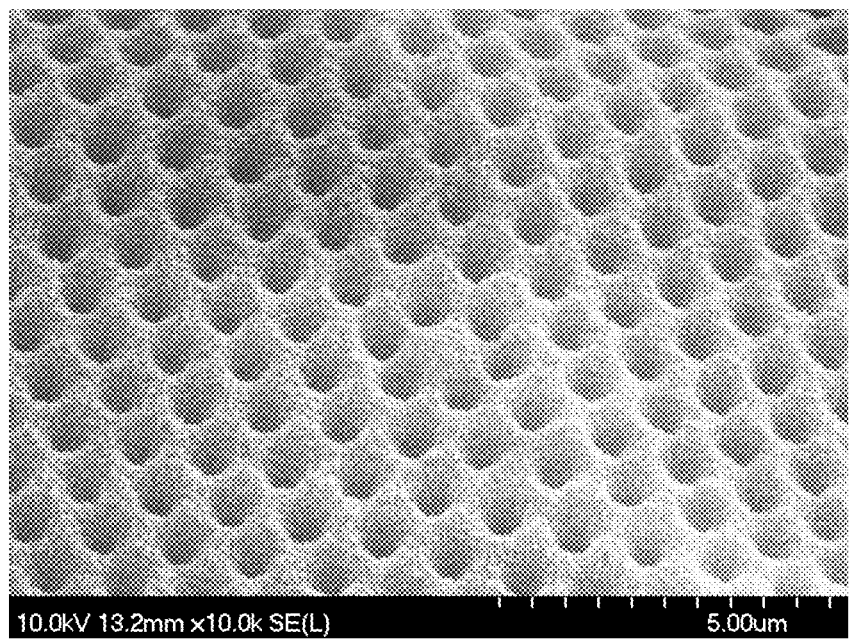
FIG. 3a-d: are SEM images of borosilicate glasses etched according to embodiments of the invention, showing that the size and scale of the formed glass array structures depends on the number of fiber drawing steps.
Figure 3B:
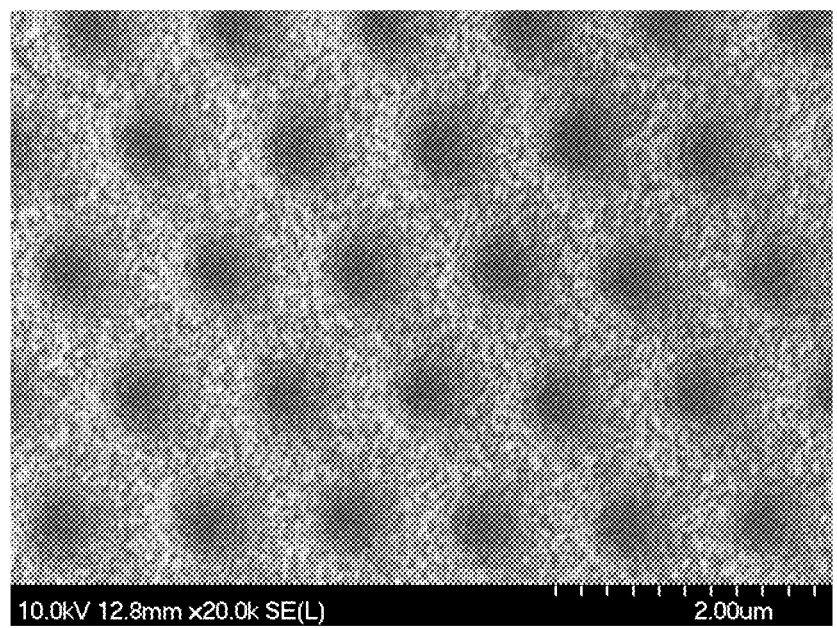
Figure 3C:
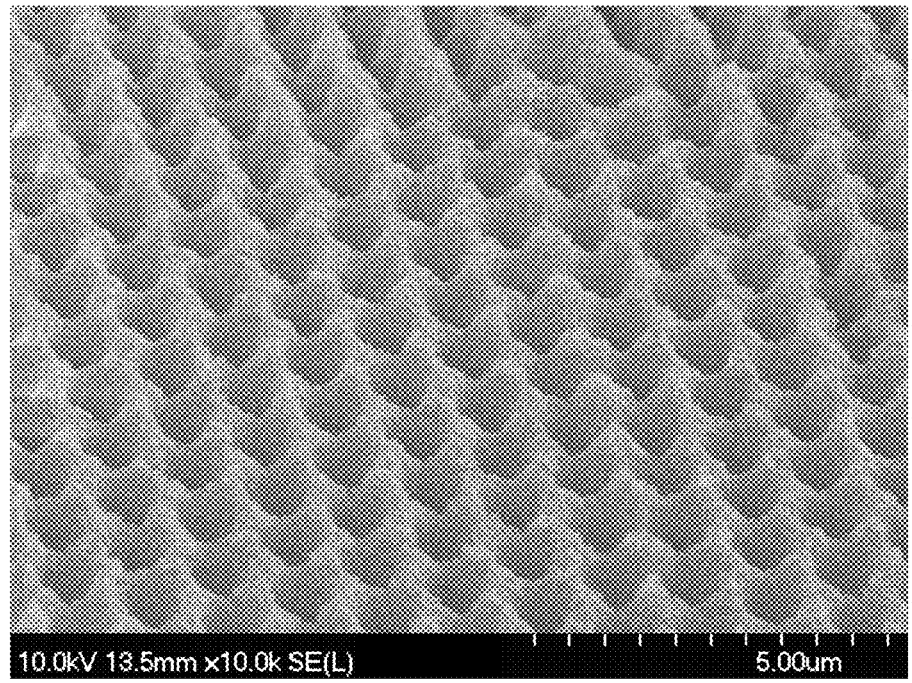
Figure 3D:
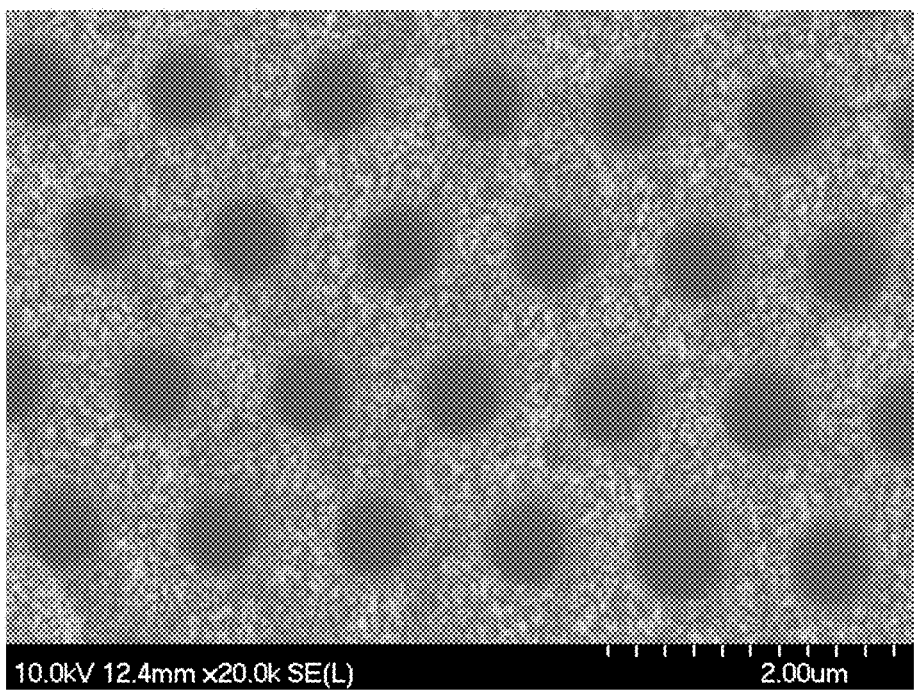

FIGS. 2a-b are SEM images of etched borosilicate glasses, showing that the size and scale of the formed glass array structures depends on the number of fiber drawing steps. FIG. 2a shows a glass array structure, produced by thermal history-based etching of a borosilicate glass that was subjected to a "double draw," i.e. two fiber drawing steps. FIG. 2b shows a glass array structure, produced by thermal history-based etching of a borosilicate glass that was subjected to a "triple draw," i.e. three fiber drawing steps. The composite glasses used were the same, but the cone aspect ratios dramatically changed when the thermal history changed by drawing a third time.

According to this example, it was unexpectedly discovered that after each draw, the etchability of both glasses is increased (i.e. they both etch faster), but because the 8487 glass phase separates into a borate phase and a silica phase more quickly, each subsequent fiber bundle produces less etching difference and thus smaller and smaller aspect ratios. Without wishing to be bound by theory, it appears that the 8487 glass phase separates more quickly than the 8330 glass, because the 8487 glass includes more sodium, which acts as a flux material.

According to this example it was unexpectedly discovered that the etch rate differences between the two glasses was reduced as the thermal histories of the glasses increased. As the 8487 glass undergoes a phase change (increases its thermal history) the highly etchable borate phase gets more and more isolated from the dominate silica phase. This phase separation also occurs with the 8330 glass, but not as quickly, because it doesn't have as much sodium (flux) as the 8487 glass.

FIGS. 3a-d are SEM images showing examples of how thermal history of borosilicate glass can affect differential etching. More specifically, FIGS. 3a-3d show the results obtained after a fourth drawing step. When the glasses were drawn a fourth time, the differential etch rate reversed, producing funnels instead of cones. The difference between these two glass etch rates continues to decrease until the 8487 glass actually etches more slowly than the 8330 glass after the forth draw.

It was unexpectedly discovered that once the 8487 glass reaches a sufficient degree of phase separation, the borate phase nucleates within a silica matrix phase. At this point of borate nucleation, additional heat treatment will not change the etch rate of the glass. Without wishing to be bound by theory it is believed that once borate nucleation occurs, the etchant cannot easily reach the borate. In other words, although the borate phase is highly etchable, it is surrounded by the silica phase and is less reachable by the etchant.

Without wishing to be bound by theory it is postulated that when both the 8487 glass and the 8330 glass have completely phase separated and nucleation of the borate phase has occurred, the 8330 glass will once again be less etchable than the 8487 glass due to its higher content of silica and smaller content of borate.

Table 6 provides a summary of the results obtained for various numbers of draws.

TABLE 6

| Draw | Temp. (° C.) | Time at Temp. (min) | Etchant | Aspect Ratio (height to base) | Image |
|---|---|---|---|---|---|
| 1 | 850 | 30 | 5% HF | 7:1 h/b (cone) | |
| 2 | 850 | 30 | 5% HF | 5:1 h/b (cone) | FIG. 2a. |
| 3 | 850 | 30 | 5% HF | 2:1 h/b (cone) | FIG. 2b. |
| 4 | 850 | 30 | 5% HF | −2:1 h/b (funnel) | FIGS. 3a-d |

Example 2

Figure 4A:
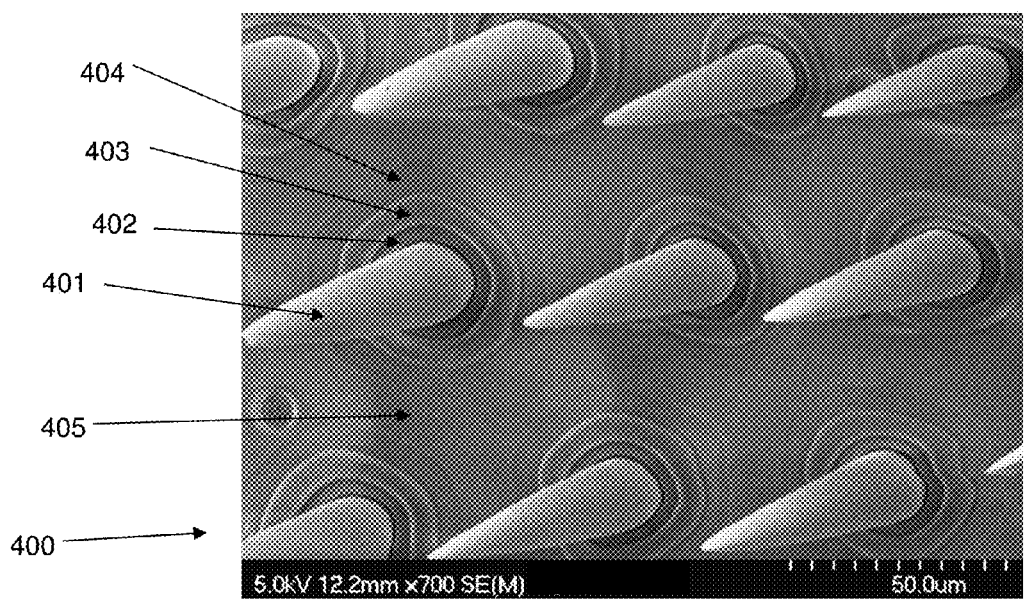
FIG. 4a-b: is an SEM image showing an array of cones processed from two different glass types.
Figure 4B:
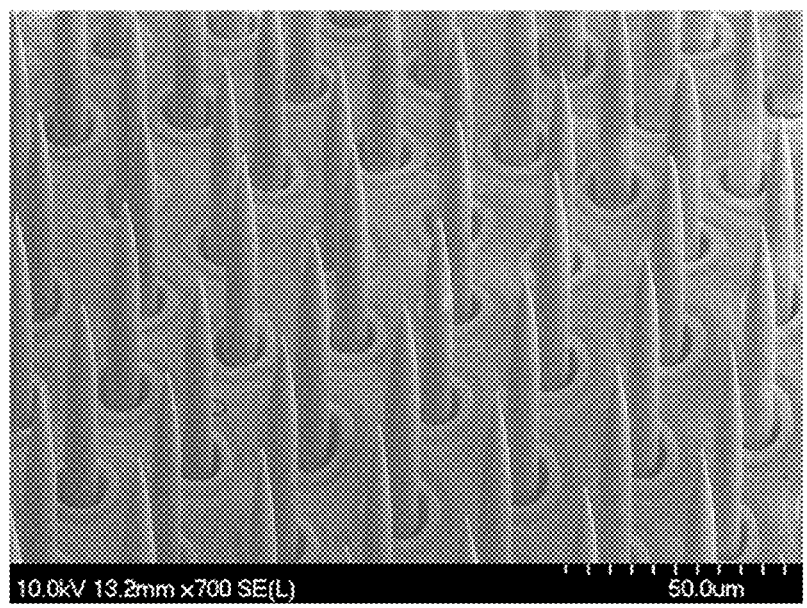

FIGS. 4a-b show an array 400 of cones processed from preform bundles comprising an 8330 glass core and a set of concentric 8487 glass tubes which form the matrix. This structure was fabricated exactly like the previously described two glass drawn bundle array, except that the 8487 cladding (matrix) was formed from a set of concentric 8487 glass tubes. All the tubes were from the same melt and one would have thought the tubes would have melted together a one continuous cladding around the 8330 cores. Note that the cones have a set of 4 concentric rings, 402, 403, 404, 405 around them. Even though the glass tubes were the same glasses from the same melt, they didn't etch exactly the same. If they had, the rings would not be present. The fact that the glass tubes had a slightly different thermal history is what caused them to unexpectedly have different etch rates and thus form distinct rings around the 8330 cores.

FIGS. 4a-b show concentric circles of 8447 glass tubes around 8330 glass cores. The concentric circles are produced by identical glasses with slightly different thermal histories. The 8487 glass adjacent to the cones were preheated before stacking the glass tubes together, which gave that tube more phase change (thermal history) than the adjacent tubes and thus etched faster than the other tubes.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A method of producing composite borosilicate glass articles, comprising the steps of:
   providing a first borosilicate glass;
   providing a second borosilicate glass separate from the first borosilicate glass;
   heat treating the first borosilicate glass to a temperature and for a period of time sufficient to change the amount of borate and silica phase separation and etchability of the first borosilicate glass, the second borosilicate glass not being subjected to the heat treatment, such that the difference in etch rate to a common etchant between the first borosilicate glass and the second borosilicate glass will be different;
   assembling the first borosilicate glass with the second borosilicate glass to form a composite; and
   etching the composite with the etchant, wherein the first borosilicate glass will etch at an etch rate that is different from the etch rate of the second borosilicate glass.

2. The method according to claim 1, wherein after the heat treating step the etchability of the first borosilicate glass is greater than a second etchability of the second borosilicate glass.

3. The method according to claim 1, wherein the first borosilicate glass and the second borosilicate glass have the same composition.

4. The method according to claim 1, wherein the heat treating step further comprises drawing the first borosilicate glass.

5. The method according to claim 1, wherein the etchant is selected from the group consisting of hydrofluoric acid, hydrofluoric acid buffered with ammonium fluoride, hydrofluorosilic acid, and combinations thereof.

6. The method according to claim 1, wherein during the heat treating step the first borosilicate glass is exposed to a temperature of from 800 to 900 degrees Celsius.

7. The method according to claim 6, wherein the first borosilicate glass is exposed to the temperature for a time period of from 20 to 40 minutes.

* * * * *